UNITED STATES PATENT OFFICE.

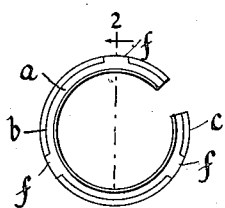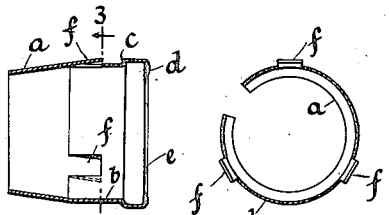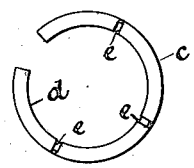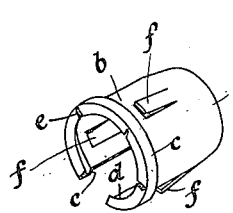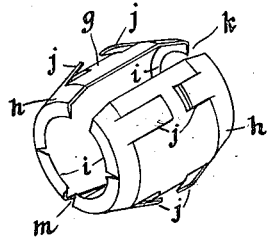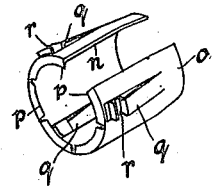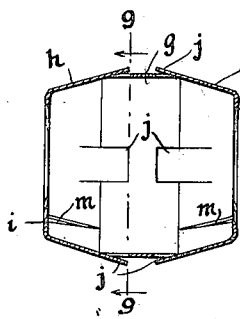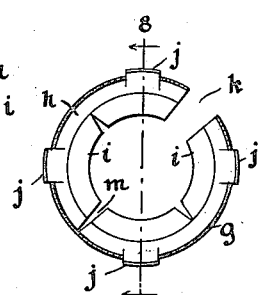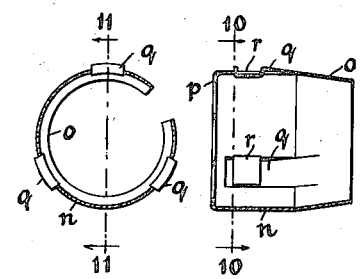

CARL M. WHEELOCK, OF MILWAUKEE, WISCONSIN, ASSIGNOR TO NEW PROCESS SPECIALTY COMPANY, A CORPORATION OF WISCONSIN.

BUSHING FOR ELECTRIC TUBULAR INSULATION.

1,236,027. Specification of Letters Patent. Patented Aug. 7, 1917.

Application filed February 6, 1914. Serial No. 816,870.

*To all whom it may concern:*

Be it known that I, CARL M. WHEELOCK, of Milwaukee, Wisconsin, have invented a Bushing for Electric Tubular Insulation, of which the following is a specification.

My invention relates to means for holding in place at outlets and other points a flexible tubing for electric wires such as that known to the trade as "circular loom," being a tube woven of textile materials and saturated with insulating compounds.

My object is to provide a means for securely attaching the tubing to the edges of openings such as those in cutout-boxes, the walls of which are thin metal plates; and to provide a means which is readily put in place without the use of tools but cannot become loose or detached of itself. Further, I aim to provide such a device as will not puncture the tubing and will protect it from abrasion on the sides of the opening. Further, I aim to produce a device which can be produced and marketed at a trifling cost. The design of my device can be made such that it is removable without the use of tools.

To illustrate my invention I have shown three forms thereof, Figures 1 to 5 illustrating the first form, Figs. 6, 8 and 9 the second form, and Figs. 7, 10 and 11 the third form. More specifically Fig. 1 is an end-view of the first form of bushing from the left, as shown in Fig. 2;

Fig. 2 is a longitudinal section on the plane 2 as shown in Fig. 1;

Fig. 3 of said figure is a transverse section on the plane 3;

Fig. 4 is an end-view from the right as shown in Fig. 2;

Figs. 5, 6 and 7 are respective views of the three forms respectively;

Figs. 8 and 9 are respectively a longitudinal section on the plane 8 and a transverse section on the plane 9 of the second form; and Figs. 10 and 11 are respectively a transverse section on the plane 10 and a longitudinal section on the plane 11 of the third form.

In these drawings each reference letter or numeral refers to the same part wherever used.

Describing first Figs. 1 to 5: This form of bushing comprises a piece of sheet metal, preferably spring-brass, shaped into tubular form with one side open so as to permit of a certain amount of diametral expansion and contraction. One end is formed with an inclined or conical surface $a$; the central portion $b$ is, however, parallel or cylindrical, and near the other end (at the right of Fig. 2) is formed an abutment-shoulder $c$. The edge of the metal at this end is bent down to form an engaging-flange $d$, which is preferably sharpened to an edge so as to easily bite into the tubing, and is divided at intervals, as shown at $e$ in Fig. 4, so as not to interfere with the diametral contraction or expansion of the bushing.

It will be understood that the flexible tubing or conduit which conveys the electric wire is passed through the center of the bushing and that the latter is then thrust, conical end first, into the hole in the outlet-box which is of the size of the parallel portion $b$. The shoulder $c$ forms a positive abutment which limits this movement, and for an abutment on the opposite side I provide spring-tongues $f$ (herein shown as three in number, but I do not limit myself to any special number) which are punched out and pressed up in the process of forming the bushing. The upstanding ends of the tongues $f$ are at a distance from the shoulder $c$ equal to or slightly greater than the thickness of the wall in the outlet-box so that, as the bushing is thrust into the hole and brings up against the shoulder $c$, the tongues $f$ are first depressed to permit the passage through and afterward spring up and abut against the opposite side of the wall from said shoulder, thus permanently fixing the bushing in place. Removal can only be accomplished by depressing the tongues $f$ or by sufficiently contracting the diameter of the bushing to enable the tongues $f$ to pass through the hole.

In Figs. 6, 8 and 9 is shown a double-ended form of the device, being substantially equivalent to the left-hand half (as shown in Fig. 2) of the first form reduplicated. This form comprises a parallel or cylindrical portion $g$, the two conical end-portions $h$, the inwardly directed edge-flanges $i$, preferably sharpened on their edges so as more easily to bite into the tubing, and the oppositely-facing spring-tongues $j$ which normally stand above the level of the surface of the cylindrical portion $g$. It will be seen that this form acts in the same manner as the preceding in that the bushing $h$ being placed upon the tubing and subsequently thrust into the hole, the conical portion $h$ will first engage the edge of the latter, which will contract its diameter to a certain extent and thereby cause the flanges $i$ to engage more deeply in the tubing, and when it reaches the cylindrical portion $g$, it will depress the set of tongues $j$ on one end and permit the bushing to pass through until it is brought to an abutment against the ends of the tongues $i$ on the opposite side, and as this occurs, the first set of tongues $j$ will have passed through the hole and will spring up and abut against the wall of the hole on the opposite side from the second set. This form of the bushing besides having the side-opening $k$, which is present in the first form, has its conical ends split as shown at $m$, but this arrangement does not constitute a part of the present invention.

The third form, Figs. 7, 10 and 11 of the drawings, is a single-ended form like the first form, but the tongues are shaped so as to dispense with the annular shoulder $c$, which thus enables the bushing to be more readily shaped. This bushing consists of the cylindrical portion $n$, the inclined or conical end-portion $o$ on one end, the inwardly turned, sharpened engaging-flange $p$ on the other end, and the channel-shaped engaging tongues $q$ which are cut out and pressed up into shape during the process of forming the bushing. The channel $r$, which is formed on the ends of these tongues, is of the same width as the wall of the hole so that when the wall has passed over the conical portion $o$ and far enough upon the cylindrical portion to come opposite the channel $r$, the tongues $q$ will spring up and engage both sides of the edge of the hole, which prevents the bushing from moving longitudinally in the hole in either direction.

It will be seen that the three devices present different advantages with regard to the possibility of removing them. As the bushing in practice is always thrust into the hole from the inner side of the outlet-box, it will be apparent that the first form when in place can be only with difficulty removed, this requiring circular compression of the bushing upon the tubing and making it impracticable to use the bushing in the same position a second time. With the second form, however, the removal is easily accomplished by depressing the tongues $j$ on the inside of the box and pushing the bushing through to the outside, leaving it strung on the outside. The third form can be removed in like manner by depressing the tongues from the inside and pulling the bushing out on that side.

Various changes and modifications in the constructions as herein shown may be made without departing from the spirit of my invention, and I wish it understood therefore that the latter is not otherwise limited than by the proper scope of my claims.

Having thus described my invention, what I claim as new and desire to secure by Letters Patent is:

1. A bushing for holding electric flexible tubing in place in a hole in a plate or wall comprising a tubular member slit along one side and having some compressive resiliency and having means projecting inwardly adapted to engage the tubing by compression produced by the edges of said hole and having further outwardly projecting means adapted to abut against the edges of the hole in the plate or wall on both sides thereof, the projecting means on one side being resilient independently of the body of the bushing itself so as to yield to permit them to pass through the hole.

2. A bushing for holding electric flexible tubing in place in a hole in a plate or wall comprising a tubular member slit along one side and having some compressive resiliency and having means projecting inwardly adapted to engage the tubing by the compression produced by the edges of said hole, and having further projecting means adapted to abut against the edges of the hole in the plate or wall on both sides thereof, the projecting means on both sides being resilient independently of the body of the bushing itself so as to yield to permit them to pass through the hole.

3. A bushing for holding electric flexible tubing in place in a hole in a plate or wall comprising a tubular member slit along one side and having some compressive resiliency and having means projecting inwardly adapted to engage the tubing by compression produced by the edges of said hole, and having further projecting means adapted to abut against the edges of the hole in the plate or wall on both sides thereof, the projecting means on one side consisting of resilient tongues which are adapted to yield inwardly to permit the bushing to pass into the hole and to spring up and abut against the wall thereof when the projecting means on the opposite side abuts on the opposite side of the wall.

4. A bushing for holding electric flexible tubing in place in a hole in a plate or wall comprising a tubular piece of sheet metal open along one side whereby it may be circumferentially contracted and having projecting elements disposed upon a transverse plane and adapted to act as a positive abutment against the edge of the hole on one side, there being formed from the sheet metal and a part thereof a plurality of spring-tongues having upstanding ends facing said projections and adapted to form an abutment for the opposite side of the wall of the hole and adapted to yield inwardly when the bushing is being thrust into the hole, said bushing having a greater internal diameter between said projecting elements and the ends of said tongues than at parts of said bushing on either side thereof whereby said bushing may be kept in yielding contact with the cylindrical walls of the hole in said plate or wall.

5. A bushing for holding electric flexible tubing in place in a hole in a plate or wall comprising a tubular piece of sheet metal open along one side whereby it may be circumferentially contracted and having projecting elements disposed upon a transverse plane and adapted to act as a positive abutment against the edge of the hole on one side, there being formed from the sheet metal and a part thereof a plurality of spring-tongues having upstanding ends facing said projections and adapted to form an abutment for the opposite side of the wall of the hole and adapted to yield inwardly when the bushing is being thrust into the hole, said bushing having the end, from which said tongues spring, tapered, and having further inwardly directed elements adapted to engage the tubing.

6. A bushing for holding electric flexible tubing in place in a hole in a plate or wall, comprising a tubular member slit along one side and having some compressive resiliency, inwardly extending projections on said member adapted to grasp the flexible tubing by the compression of the bushing produced by the edges of said hole, and outwardly projecting means resilient independently of the body of the bushing adapted to abut against the edge of said hole.

In witness whereof I have hereunto set my hand in the presence of two witnesses.

CARL M. WHEELOCK.

Witnesses:
  JOHN T. KELLY,
  A. H. PETERSEN.